(12) United States Patent  
Honma

(10) Patent No.: US 7,546,020 B2
(45) Date of Patent: Jun. 9, 2009

(54) OPTICAL FIBER HOLDER

(75) Inventor: Toshihiko Honma, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 11/794,027

(22) PCT Filed: Nov. 2, 2006

(86) PCT No.: PCT/JP2006/321978

§ 371 (c)(1),
(2), (4) Date: Jun. 21, 2007

(87) PCT Pub. No.: WO2007/052750

PCT Pub. Date: May 10, 2007

(65) Prior Publication Data

US 2008/0159701 A1 Jul. 3, 2008

(30) Foreign Application Priority Data

Nov. 4, 2005 (JP) ............................. 2005-321207

(51) Int. Cl.
G02B 6/00 (2006.01)
G02B 6/255 (2006.01)

(52) U.S. Cl. .......................... 385/137; 385/96; 385/97; 385/98; 385/99

(58) Field of Classification Search ......... 385/134–137, 385/76, 83, 96–99
See application file for complete search history.

(56) References Cited

U.S. PATENT DOCUMENTS

| 5,524,167 | A  | * | 6/1996  | Ewert et al.   | 385/137 |
| 6,078,719 | A  | * | 6/2000  | Wiegand et al. | 385/137 |
| 6,377,743 | B1 | * | 4/2002  | Ueda et al.    | 385/137 |
| 6,608,957 | B2 | * | 8/2003  | Sudo et al.    | 385/135 |
| 6,816,662 | B2 | * | 11/2004 | Doss et al.    | 385/134 |

FOREIGN PATENT DOCUMENTS

| JP | 08-286079   | 11/1996 |
| JP | 2000-292639 | 10/2000 |
| JP | 2002-162530 | 6/2002  |
| JP | 2003-114351 | 4/2003  |
| JP | 2003-172845 | 6/2003  |
| JP | 2003-207690 | 7/2003  |
| JP | 2004-206023 | 7/2004  |
| JP | 2005-249922 | 9/2005  |
| JP | 2005-292292 | 10/2005 |

* cited by examiner

Primary Examiner—Brian Healy
Assistant Examiner—Guy G Anderson
(74) Attorney, Agent, or Firm—Global IP Counselors, LLP

(57) ABSTRACT

An optical fiber holder automatically corrects the tendency of a buffered optical fiber to bend, can position an optical fiber so as to make contact with the V groove, and can readily perform an operation for positioning the optical fiber. The optical fiber holder includes a base stage having a groove configured and arranged to accommodate a buffered optical fiber or an optical fiber ribbon; and a lid that is disposed above the groove. The lid is openable and closeable and has a restraining member. The restraining member includes a contacting part configured and arranged to bend the buffered optical fiber or optical fiber ribbon.

10 Claims, 4 Drawing Sheets

OPTICAL FIBER HOLDER

FIELD OF THE INVENTION

The present invention relates to an optical fiber holder for holding a buffered optical fiber or an optical fiber ribbon in order to place distal end portions of the optical fibers contained therein on a V-groove stage.

BACKGROUND OF THE INVENTION

An example is disclosed in Japanese Patent Application Laid-Open No. 2000-292639, in which a plurality of buffered optical fibers is lined in rows and fusion-spliced at the same time. In this example, first, the buffered optical fibers are arranged at a predetermined pitch in a guiding grooves provided to an optical fiber holder, and are held once a lid has been closed. In this state, a fiber coating is removed, the exposed glass fibers are then cut to a predetermined length, and end surfaces of the fibers are lined up.

With the buffered optical fibers held in the optical fiber holder, the optical fiber holder is then placed in a fusion-splicer. End portions of the optical fibers protruding from an end surface of the holder are then placed in V grooves of a V-groove stage of the fusion-splicer and positioned. The end portions of the optical fibers are lightly held by the V grooves and are aligned by adjusting the position of the V-groove stage in the lateral and vertical directions. Positioning the buffered optical fibers before they are fusion-spliced at the same time is an important operation and influences operation efficiency.

The end surfaces of the optical fibers then face end surfaces of another plurality of similarly prepared buffered optical fibers, and the optical fibers are subjected to arc discharging or are otherwise fusion spliced at the same time. The fused part where the glass fibers are exposed is then reinforced using a reinforcing member. The same method is used to fusion-splice optical fiber ribbons in which a plurality of optical fibers have been aligned in a shared coating and integrated, as well as to fusion-splice an optical fiber ribbon and a plurality of buffered optical fibers.

SUMMARY OF THE INVENTION

Problem to be Solved by the Invention

A buffered optical fiber that has been wound on a bobbin has a tendency to bend. When a buffered optical fiber having a tendency to bend is held by an optical fiber holder, the optical fibers protruding from an end surface of the holder will be of irregular orientation, and the optical fibers will intersect with each other or separate and spread in the vertical direction. In such instances, the holder must be moved or another action must be taken in order to position the optical fibers in the V grooves. In addition, even when an optical fiber ribbon is used, the optical fibers are placed on the fusion-splicer while the optical fiber holder is tilted so that the optical fibers will make contact without rising up from the V grooves. However, the angle of inclination is not readily increased due to the bending rigidity of the optical fibers.

It is an object of the present invention to provide an optical fiber holder that automatically corrects the tendency of a buffered optical fiber to bend, that can position an optical fiber so as to make contact with the V groove, and that can readily perform an operation for positioning the optical fiber.

Means for Solving the Problem

To resolve these problems, the present invention provides an optical fiber holder comprising a base stage having a groove configured and arranged to accommodate a buffered optical fiber or an optical fiber ribbon; and a lid that is disposed above the groove, is openable and closeable, and has a restraining member; wherein a contacting part configured and arranged to bend the buffered optical fiber or optical fiber ribbon is provided to a distal end of the restraining member.

The contacting part preferably protrudes 0.3 mm to 2.0 mm from an end surface of the base stage in a longitudinal direction of the groove. The contacting part preferably has a protuberance that can bend the buffered optical fiber or optical fiber ribbon at an angle of 2° to 10° toward the base stage, in a state wherein the lid is closed and the buffered optical fiber or optical fiber ribbon is held in place. A surface of the contacting part that faces the buffered optical fiber or optical fiber ribbon preferably includes an inclined surface to guide the buffered optical fiber or optical fiber ribbon. The contacting part preferably has a control part configured and arranged to control a lateral position of the buffered optical fiber or optical fiber ribbon. The restraining member is preferably composed of a synthetic resin.

ADVANTAGE OF THE INVENTION

The distal end portion of the optical fibers can be automatically bent to a predetermined angle by the contacting part, and held while pressed into the V grooves of the fusion-splicer. Accordingly, the end portions of the optical fibers in the fusion-splicer can be positioned in an uncomplicated manner, and the ability to fusion-splice the optical fibers can be improved.

DESCRIPTION OF THE REFERENCE NUMERALS

Figure 1:
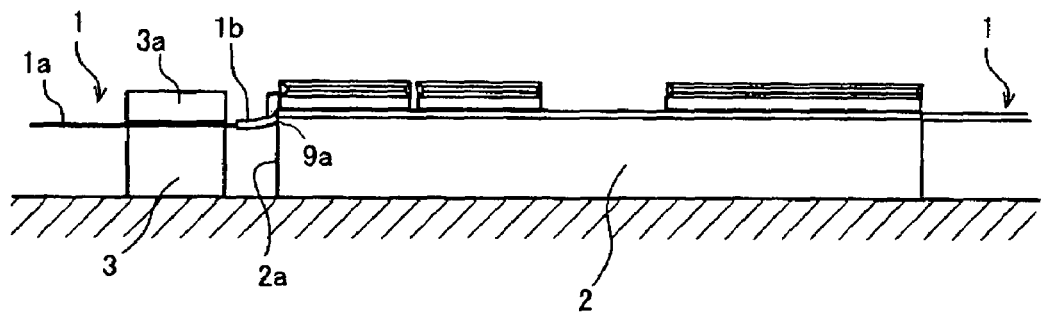
FIG. 1 is a schematic view showing a state in which a first embodiment of the optical fiber holder of the present invention is used.

1 Buffered optical fiber
1a Glass fiber
1b Fiber coating
2 Optical fiber holder
2a End surface of the holder
3 V-groove stage 4 Base stage
4a Support shaft
5 First lid
6 Second lid
7 Third lid
8 Groove
8a Distal end portion of the groove
9 Restraining member
9a Contacting part
9b Inclined surface
9c Control part
10, 11a, 11b Rubber pad
12a, 12b Magnet

BEST MODE FOR CARRYING OUT THE INVENTION

Embodiments of the present invention shall be described below with reference to the drawings. The drawings are provided for explanatory purposes and are not meant to limit the scope of the invention. In the drawings, the same components are marked using the same numerals so that descriptions will not be repeated. The proportions of dimensions in the drawings are not necessarily accurate.

FIG. 1 is a schematic view showing a state in which a first embodiment of the optical fiber holder of the present invention is used. A buffered optical fiber 1 includes, e.g., a glass fiber 1a having an outer diameter of 125 μm covered with a protective coating having an outer diameter of about 250 μm, and further applied with a colored coating or reinforcing fiber coating 1b as needed. Once the buffered optical fiber 1 is held in place by an optical fiber holder 2, the fiber coating 1b is left at a predetermined length relative to an end surface 2a of the holder, and the distal end thereof is removed. The exposed glass fiber 1a is then cut at a predetermined length from the end surface 2a of the holder and is placed in a fusion-splicer (not shown). Once the optical fiber holder 2 has been placed in the fusion-splicer, end portions of the optical fibers (glass fibers 1a) protruding from the end surface 2a of the holder are placed on a V-groove stage 3 and are pressed and positioned by a clamp piece 3a.

Figure 2:
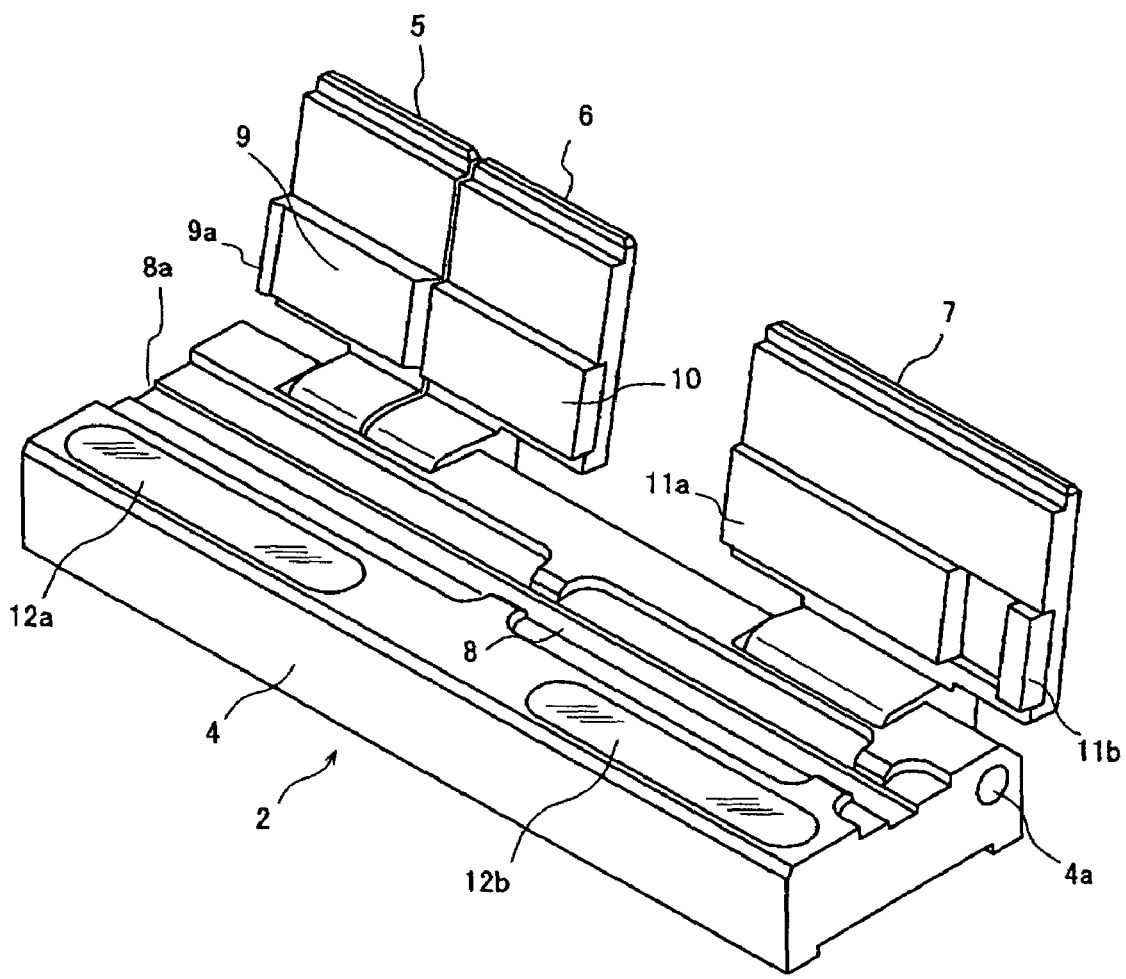
FIG. 2 is a perspective view of the first embodiment of the optical fiber holder of the present invention.
Figure 3A:
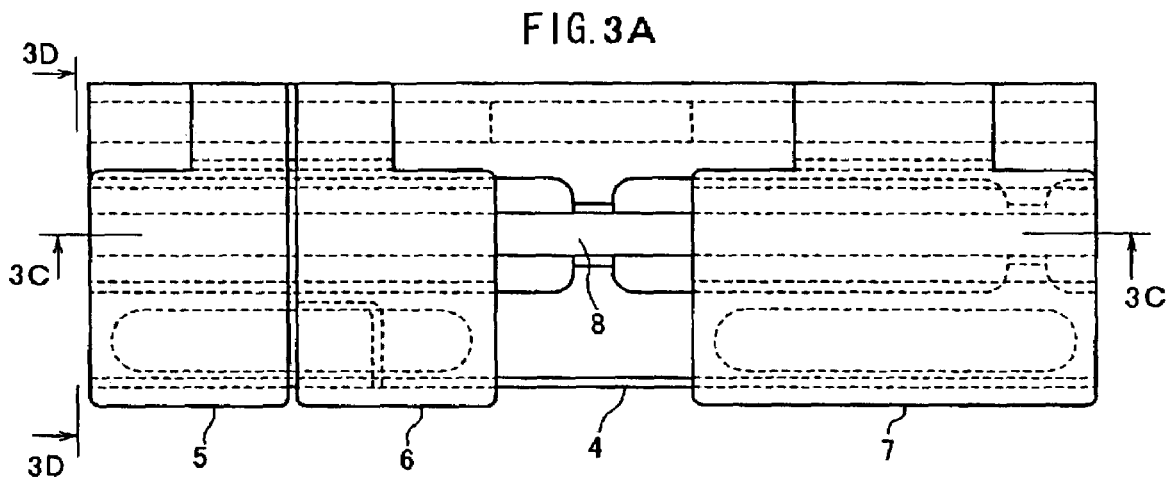
FIG. 3A is a plan view of the optical fiber holder of FIG. 2.
Figure 3B:
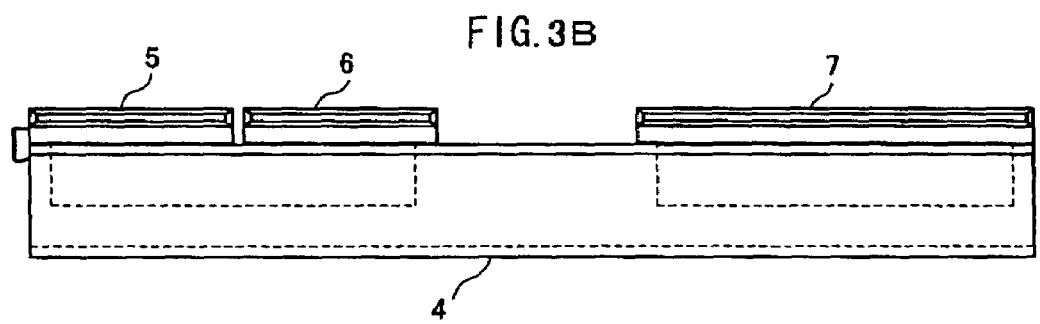
FIG. 3B is a front view.
Figure 3C:
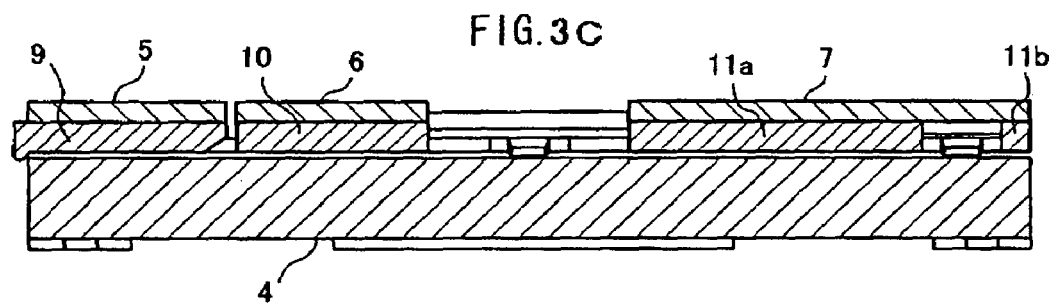
FIG. 3C is a cross-sectional view along the 3C-3C line.
Figure 3D:
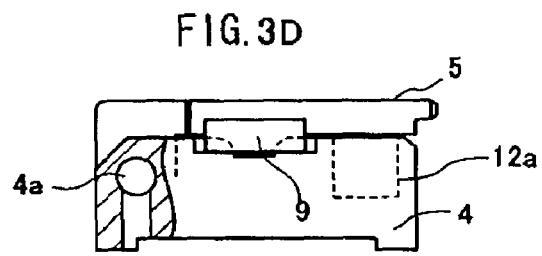
FIG. 3D is a cross-sectional view along the 3D-3D line.

FIG. 2 is a perspective view of the first embodiment of the optical fiber holder of the present invention. FIG. 3A is a plan view of the optical fiber holder of FIG. 2; FIG. 3B is a front view; FIG. 3C is a cross-sectional view along the 3C-3C line; FIG. 3D is a cross-sectional view along the 3D-3D line. The optical fiber holder 2 comprises, e.g., a first lid 5, second lid 6, and third lid 7 openably and closeably attached to a base stage 4 composed of a rectangular block by a support shaft 4a. An upper surface of the base stage has a groove 8 for accommodating the buffered optical fiber.

The first lid 5 is positioned so as to press down on a distal end 8a of the groove 8. When the first lid is shut to seal the groove 8, the first lid is locked by a magnet 12a embedded in the base stage 4. A restraining member 9 for accommodating and holding a embedded in the base stage 4. A restraining member 9 for accommodating and holding a distal end portion of the buffered optical fiber 1 is bonded or otherwise attached to the surface of the first lid 5 that faces the buffered optical fiber. A gap through which one or more buffered optical fibers can be easily inserted is thereby formed between the bottom surface of the groove 8 and the restraining member 9. A single-core buffered optical fiber or an optical fiber ribbon can be inserted through the gap.

The second lid 6 is provided adjoined to a rear part of the first lid 5. When the second lid is shut to cover the groove 8, the second lid is locked by the magnet 12a embedded in the base stage 4. A rubber pad 10 for elastically pressing down a middle part of the buffered optical fiber is bonded or otherwise attached to a surface of the second lid 6 that faces the buffered optical fiber, and securely holds the distal end portion of the buffered optical fiber in an accommodated state.

The third lid 7 is provided to a rear part of the groove 8, and is locked by a magnet 12b embedded in the base stage 4 when shut to cover the groove 8. Rubber pads 11a, 11b for pressing down and clamping the fiber coating 1b of the buffered optical fiber 1 are bonded or otherwise attached to a surface of the third lid 7 that faces the buffered optical fibers, and act to securely hold the buffered optical fiber that has been inserted into the groove 8 so that the buffered optical fiber will not move in a longitudinal direction.

Figure 5:
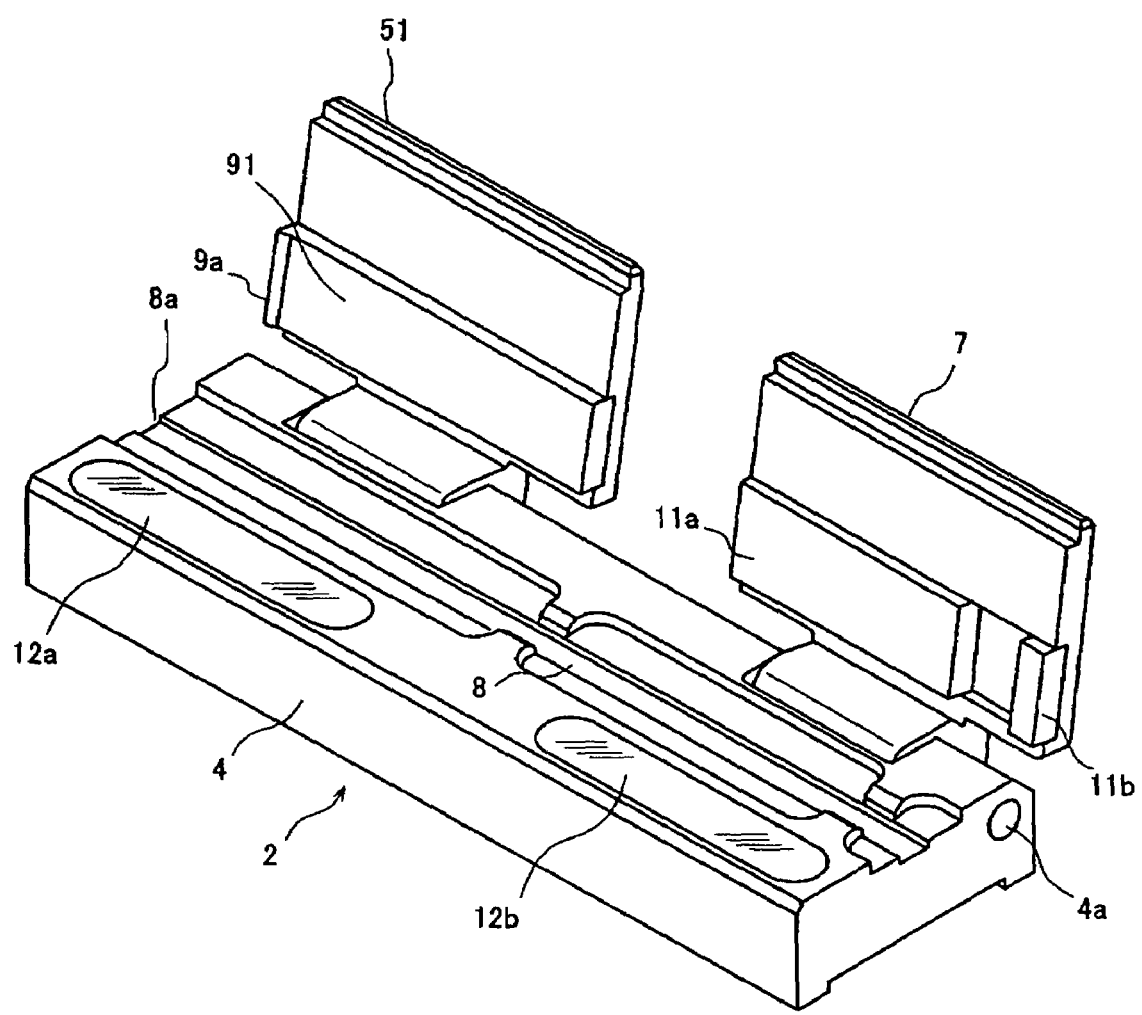
FIG. 5 is a perspective view of a second embodiment of the optical fiber holder of the present invention.

FIG. 5 is a perspective view of a second embodiment of the optical fiber holder of the present invention. In the optical fiber holder of the second embodiment, the second lid 6 and first lid 5 of the optical fiber holder of the first embodiment are integrated into a single lid 51, and the restraining member 9 and rubber pad 10 are integrated into a single rubber pad 91.

Figure 4A:
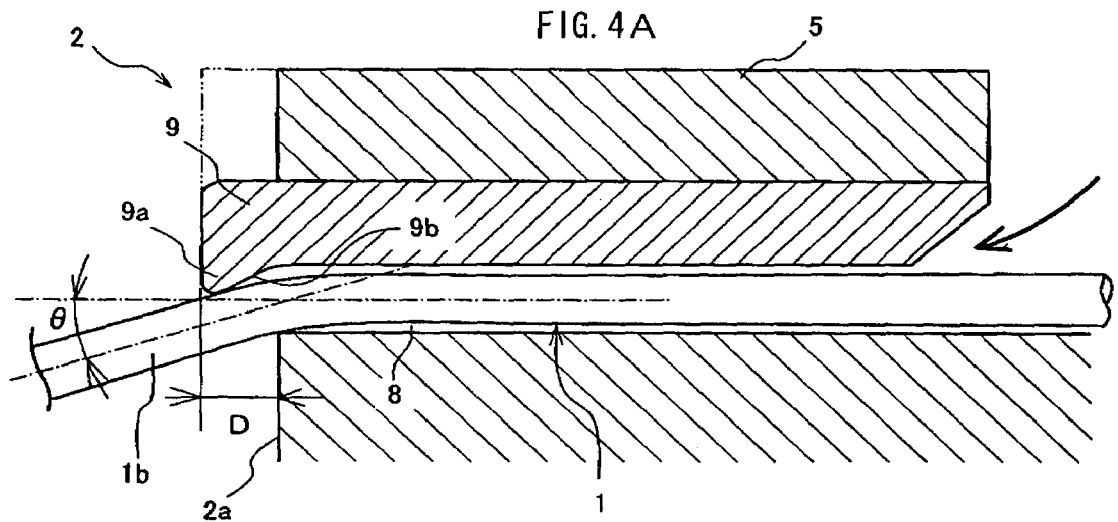
FIG. 4 are enlarged views of a contacting part of the optical fiber holder of FIG. 2, with FIG. 4A being a cross sectional view along a groove, FIG. 4B being a cross-sectional view along a groove 8 in another example, and FIGS. 4C and 4D being cross-sectional views perpendicular to the groove 8 of the other example.
Figure 4B:
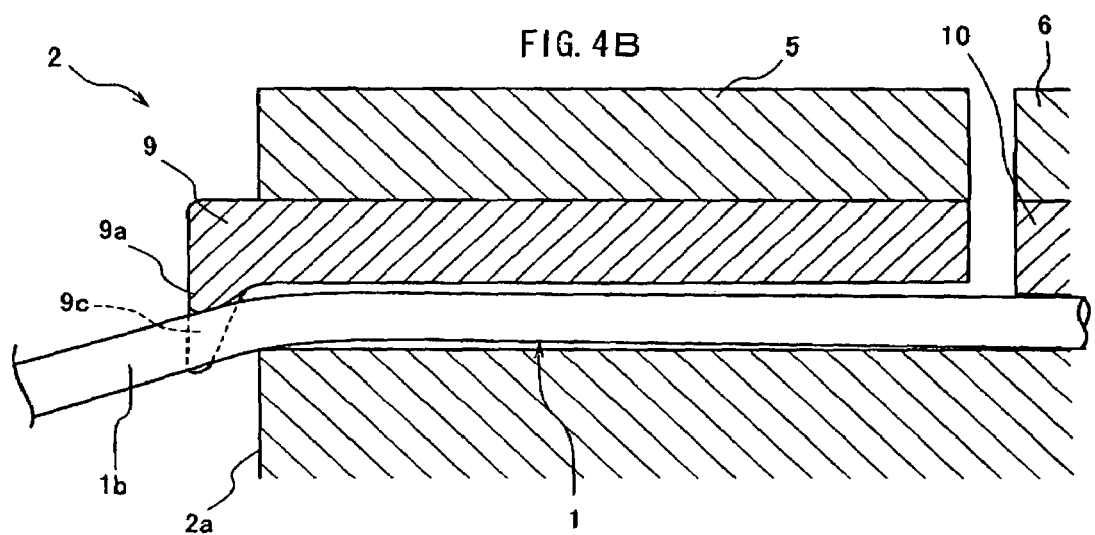
Figure 4C:
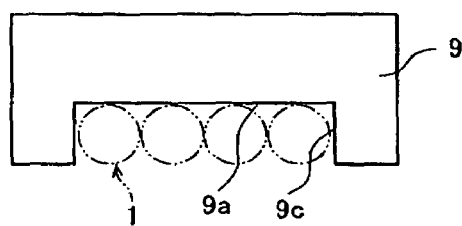
Figure 4D:
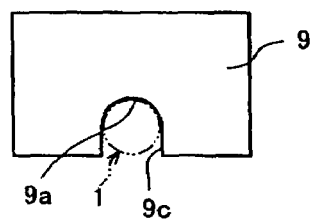

FIGS. 4A and 4B are enlarged views of a contacting part of the optical fiber holder of FIG. 2, with FIG. 4A being a cross sectional view along a groove 8 in one example, FIG. 4 B being a cross-sectional view along a groove 8 in another example, and FIGS. 4C and 4D being cross-sectional views perpendicular to the groove 8 of the other example.

A distal end portion of the restraining member 9 has a contacting part 9a, as shown in FIG. 4A. The contacting part 9a is formed into a convex shape for obstructing an outlet side of the groove 8 so as to prevent the distal end portion of the buffered optical fiber 1 from protruding freely past the length of the groove 8. When the first lid 5 is closed, the contacting part 9a elastically makes contact with the buffered optical fiber 1 protruding from the end surface 2a of the holder, and bends the buffered optical fiber 1 downward at an angle.

Accordingly, even when the buffered optical fiber 1 has a tendency to bend, the buffered optical fiber 1 can be arranged so as to face only downward. In this state, the fiber coating 1b is removed, and the glass fiber is exposed and placed onto the V-groove stage as shown in FIG. 1. The end portion of the optical fiber protruding from the end surface 2a of the holder is positioned in the V groove so as to be pressed against the V groove, and the end portion of the optical fiber can be prevented from rising up from inside the V groove.

The distal end portion of the buffered optical fiber 1 can be bent with a simple structure in which the contacting part 9a protrudes from the end surface 2a of the holder a predetermined amount. The amount of protrusion D is preferably about 0.3 mm to 2.0 mm, and is more preferably 0.5 mm to 1.5 mm. The amount D is the amount by which the restraining member 9 protrudes relative to the end surface of the base stage 4. Therefore, the first lid 5 may protrude along with the restraining member 9 as indicated by the double-dot-dashed line.

An angle θ to which the buffered optical fiber 1 is bent by the contacting part 9a is preferably about 2° to about 10°, and is more preferably 5° to 10°. If the angle θ is less than 2°, the buffered optical fiber will not be pressed against the V-groove stage with enough strength and will readily separate from the V grooves. If the bending angle θ is greater than 10°, the buffered optical fiber will be bent with too much strength and will break when placed into the V grooves of a fusing splicer. Increasing the size of the gap between the V-groove stage and optical fiber holder in order to avoid breakage is undesirable because the distance between a fusion-connecting part and the fiber coating 1b will increase, a fusion reinforcing member will not be readily placed on top, and reinforcement may be inadequate.

When the buffered optical fiber 1 is being held by the optical fiber holder 2, the distal end portion of the buffered optical fiber held by a portion of the first lid 5 enters the groove 8 of the base stage 4. In this instance, one to several buffered optical fibers enter the groove 8 with the first lid 5 in an open state, and the first lid 5 and second lid 6 are both closed with the distal end portion side in a pressed-down state, whereby the buffered optical fiber is held and fixed in place. The same is also true in instances in which an optical fiber ribbon is used (in such instances, the optical fiber holder of the second embodiment, in which the second lid 6 and first lid 5 are integrated into the lid 51, will be adequate).

However, when the optical fiber holder is holding a plurality of single-core buffered optical fibers, a method can be used in which the buffered optical fibers 1 are inserted one at a time into the gap between the groove 8 and the restraining member 9 from the rear of the first lid as indicated by the arrow in a state in which only the first lid 5 is shut, as shown in FIG. 4A. The distal end portions of the buffered optical fibers 1 are automatically aligned and accommodated in the groove 8. The second lid 6 is then closed, whereby the buffered optical fibers 1 are held and fixed in place by the rubber pad 10.

The side of the contacting part 9a facing the buffered optical fiber is formed as an inclined surface 9b so that the buffered optical fiber 1 will be allowed to protrude smoothly from the end surface 2a of the holder when the buffered optical fibers 1 are inserted into the gap between the groove 8 and the restraining member 9. The buffered optical fibers 1 are bent downward along the inclined surface 9b of the contacting part 9a, and caused to protrude from the end surface 2a of the holder passing through a narrow gap formed with the distal end portion 8a of the groove. The buffered optical fiber passes through this narrow gap while being elastically bent, whereby the buffered optical fibers are automatically arranged in a single line without the optical fibers crossing over one another.

The contacting part 9a can also be formed into a shape having a controlling part 9c for controlling the lateral movement of the buffered optical fiber 1, as shown in FIG. 4B. The controlling part 9c is formed by a wall that protrudes from an edge of the contacting part 9a, as shown in FIG. 4C. The tendency of the buffered optical fibers 1 to bend in the lateral direction is controlled, so that the buffered optical fibers extend straight in the groove direction of the V-groove stage.

The buffered optical fiber 1 is positioned in the lateral direction by the distal end groove of the groove 8, but is also prevented from spreading in the lateral direction while being bent by the contacting part 9a. Therefore, the buffered optical fiber can be readily placed in the V grooves of the V-groove stage. This configuration can also be used to fusion-splice single-core optical fibers, as shown in FIG. 4D.

The restraining member 9 having the contacting part 9a causes the buffered optical fiber, which is inserted, to be bent, and is not used to fix the buffered optical fiber 1 in place. Therefore, the restraining member 9 may be formed from a metallic material. However, when taking the forming of the inclined surface 9b into account, the restraining member 9 is preferably formed from a synthetic resin so as to exhibit good sliding properties, to leave the coating of the buffered optical fiber undamaged, and to enable the manufacture thereof to be performed inexpensively.

The present application is based on a Japanese patent application filed on Nov. 4, 2005 (Japanese Patent Application No. 2005-321207), and the contents of the patent application are incorporated herein by reference in its entirety.

INDUSTRIAL APPLICABILITY

The optical fiber holder of the present invention applies to the mounting of a buffered optical fiber or optical fiber ribbon in a fusion-splicer.

What is claimed is:

1. An optical fiber holder comprising:
   a base stage having a groove configured and arranged to accommodate a buffered optical fiber or an optical fiber ribbon parallel to the groove, the groove having a distal end adjacent to an end surface of the base stage; and
   a lid disposed above the groove, the lid being movable between an open position and a closed position and having a restraining member attached to the lid for movement therewith such that with the lid in the closed position the restraining member protrudes beyond the end surface of the base stage away from the distal end of the groove, the restraining member having a contacting part at a distal end thereof configured and arranged to bend the buffered optical fiber or optical fiber ribbon as the lid is moved from the open position to the closed position.

2. The optical fiber holder according to claim 1, wherein the contacting part protrudes 0.3 mm to 2.0 mm beyond the distal end of the groove and the end surface of said base stage in a longitudinal direction of the groove.

3. The optical fiber holder according to claim 1, wherein said connecting part has a protuberance configured to bend the distal end of said buffered optical fiber or optical fiber ribbon at an angle of 2° to 10° toward said base stage with said lid closed and said buffered optical fiber or optical fiber ribbon held in place.

4. The optical fiber holder according to claim 1, wherein a surface of said contacting part facing said buffered optical fiber or optical fiber ribbon includes an inclined surface to guide said buffered optical fiber or optical fiber ribbon.

5. The optical fiber holder according to claim 1, wherein the contacting part has a control part configured and arranged to control a lateral position of said buffered optical fiber or optical fiber ribbon.

6. The optical fiber holder according to claim 1, wherein the restraining member is composed of a synthetic resin.

7. The optical fiber holder according to claim 1, wherein the groove extends in a longitudinal direction of the base stage.

8. The optical fiber holder according to claim 1, wherein the lid pivots about a support shaft that extends through the base stage.

9. The optical fiber holder according to claim 8, wherein the base stage includes a second lid that pivots about the support shaft for movement between an open position and a closed position such that with the lid in the closed position, the lid covers a first portion of the groove and with the second lid in the closed position, the second lid covers a second portion of the groove.

10. The optical fiber holder according to claim 9, wherein the second lid includes a rubber pad such that with the second lid in the closed position, the rubber pad clamps the buffered optical fiber or optical fiber ribbon within the groove.

* * * * *